United States Patent
Persson et al.

(10) Patent No.: US 11,392,285 B2
(45) Date of Patent: *Jul. 19, 2022

(54) METHOD AND A SYSTEM FOR PERFORMING SCRUBBING IN A VIDEO STREAM

(71) Applicant: SPOTIFY AB, Stockholm (SE)

(72) Inventors: Karl-Johan Persson, Stockholm (SE); Steven Paul Everington, Stockholm (SE); Fredric Vinna, Stockholm (SE); Stig Gustav Viktor Soderstrom, Stockholm (SE)

(73) Assignee: SPOTIFY AB, Stockholm (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/816,085

(22) Filed: Mar. 11, 2020

(65) Prior Publication Data

US 2021/0034227 A1     Feb. 4, 2021

Related U.S. Application Data

(63) Continuation of application No. 14/714,163, filed on May 15, 2015, now Pat. No. 10,620,810.

(51) Int. Cl.
*G06F 3/04847*     (2022.01)
*G06F 3/0482*     (2013.01)
(Continued)

(52) U.S. Cl.
CPC ........ *G06F 3/04847* (2013.01); *G06F 3/0482* (2013.01); *G06F 3/04842* (2013.01);
(Continued)

(58) Field of Classification Search
None
See application file for complete search history.

(56) References Cited

U.S. PATENT DOCUMENTS

| 8,849,101 B2 | 9/2014 | Rosser et al. |
| 2003/0221194 A1* | 11/2003 | Thiagarajan ............. H04N 5/76 725/55 |

(Continued)

OTHER PUBLICATIONS

Communication pursuant to Article 94(3) issued by European Patent Office for European Patent Application No. EP16167129.2, dated Nov. 17, 2017, 4 pages.

(Continued)

*Primary Examiner* — Hung Q Dang
(74) *Attorney, Agent, or Firm* — Morgan, Lewis & Bockius LLP

(57) ABSTRACT

The present disclosure generally relates to providing video, and more particularly to streaming of video. There is described a method and a system for performing scrubbing in a video stream of a video item selected at a media device. The video item is streamed from a server system to the media device. The method comprises dividing the selected video item into a number of segments and selecting a first snippet for each segment, which snippet is pre-buffered. The video stream of a first segment of the selected video item is played at the media device simultaneously as scrubbing to a second segment of the selected video item. When the scrubbing is done the video stream of the first segment stops and the first snippet of the second segment starts playing seamlessly.

12 Claims, 7 Drawing Sheets

(51) Int. Cl.
  *G06F 3/04842* (2022.01)
  *H04L 65/61* (2022.01)
  *H04L 65/60* (2022.01)
  *H04N 21/2387* (2011.01)
  *H04N 21/6587* (2011.01)
(52) U.S. Cl.
  CPC ........ *H04L 65/4069* (2013.01); *H04L 65/601* (2013.01); *H04N 21/2387* (2013.01); *H04N 21/6587* (2013.01)

(56) References Cited

U.S. PATENT DOCUMENTS

| | | |
|---|---|---|
| 2008/0310814 A1 | 12/2008 | Bowra et al. |
| 2009/0292819 A1* | 11/2009 | Kandekar .......... H04N 7/17318 709/231 |
| 2009/0317064 A1* | 12/2009 | Matsubayashi .... H04N 21/4331 725/87 |
| 2011/0061028 A1 | 3/2011 | Bachman et al. |
| 2012/0072611 A1 | 3/2012 | Kandekar et al. |
| 2012/0166950 A1 | 6/2012 | Frumar et al. |
| 2012/0331106 A1 | 12/2012 | Ramamurthy et al. |
| 2013/0007223 A1 | 1/2013 | Luby et al. |
| 2014/0189735 A1 | 7/2014 | Cudak et al. |
| 2015/0037006 A1 | 2/2015 | Tapper |
| 2015/0095937 A1 | 4/2015 | Tobin |

OTHER PUBLICATIONS

Communication pursuant to Article 94(3) issued by European Patent Office for European Patent Application No. EP16167129.2, dated Mar. 22, 2018, 4 pages.
Decision to Grant issued by European Patent Office for European Patent Application No. EP16167129.2, dated Apr. 26, 2019, 2 pages.
Extended European Search Report issued by European Patent Office for European Patent Application No. 19168497.6, dated Jun. 11, 2019, 4 pages.
Extended European Search Report issued by European Patent Office for European Patent Application No. EP16167129.2, dated Jul. 25, 2016, 8 pages.
Notice of Allowance dated Sep. 20, 2017 issued by the United States Patent and Trademark Office on U.S. Appl. No. 14/839,526, 5 pages.
Office Action dated May 24, 2016 issued by the United States Patent and Trademark Office on U.S. Appl. No. 14/839,526, 11 pgs.
Office Action dated Jan. 25, 2016 issued by the United States Patent and Trademark Office on U.S. Appl. No. 14/839,526, 9 pages.
Office Action dated Mar. 8, 2017, issued by the United States Patent and Trademark Office on U.S. Appl. No. 14/839,526, 6 pages.
Persson, Office Action, U.S. Appl. No. 16/816,085, dated Feb. 25, 2021, 26 pgs.
Persson, Office Action, U.S. Appl. No. 14/714,163, dated Dec. 27, 2016, 22 pgs.
Persson, Final Office Action, U.S. Appl. No. 14/714,163, dated May 31, 2017, 29 pgs.
Persson, Office Action, U.S. Appl. No. 14/714,163, dated Apr. 30, 2018, 23 pgs.
Persson, Office Action, U.S. Appl. No. 14/714,163, dated Sep. 14, 2018, 12 pgs.
Persson, Final Office Action, U.S. Appl. No. 14/714,163, dated May 17, 2019, 12 pgs.
Persson, Notice of Allowance, U.S. Appl. No. 14/714,163, dated Dec. 4, 2019, 10 pgs.

* cited by examiner

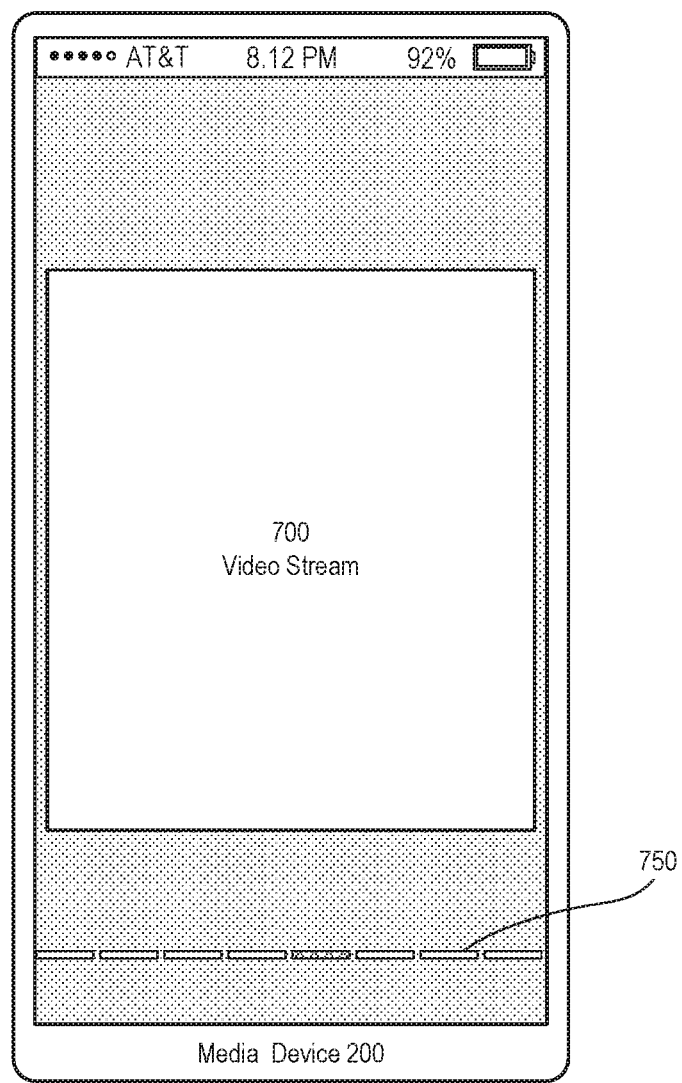
Figure 6     Touch and hold

METHOD AND A SYSTEM FOR PERFORMING SCRUBBING IN A VIDEO STREAM

CLAIM OF PRIORITY

This application is a continuation of U.S. patent application Ser. No. 14/714,163, titled "A METHOD AND A SYSTEM FOR PERFORMING SCRUBBING IN A VIDEO STREAM", filed May 15, 2015; which is herein incorporated by reference.

FIELD OF INVENTION

The present disclosure generally relates to providing video, and more particularly to streaming of video. In particular, the embodiments described herein relate to a method and a system for performing scrubbing in a video stream of a video item selected at a media device.

BACKGROUND

As computer technology has improved, the digital media industry has evolved greatly in recent years. Users are able to use media devices such as mobile communication devices (e.g., cellular telephones, smart phones, tablet computers, etc.) to consume video and other forms of media content. For instance, users can watch video content (e.g., movies, television (TV) broadcasts, etc.) on a variety of media devices.

At the same time, advances in network technology have increased the speed and reliability with which information can be transmitted over computers and networks. It is therefore possible for users to stream video content over different networks as needed, or on demand, rather than receiving a complete file in physical media (such as a CD or a DVD, or downloading the entire file) before consuming the video content.

When streaming video content to a media device it sometimes happens that a user wants to perform scrubbing in order to quickly browse through the video item and see if there are any interesting episodes coming up. Such scrubbing is performed frame by frame in a speed that is faster than the playback speed. The user may sometimes also perform fast scrubbing by moving a time cursor, indicative of how much time that lapsed since the starting time of the video item, to a desired place of a time line indicating the playing time of the video item. During this time, when the time cursor is moved, the video item will flicker in front of the user's eyes and start playing again, after some delay, from the place (on the time line) where the time cursor is dropped.

SUMMARY

It is in view of the above considerations and others that the various embodiments disclosed herein have been made.

It is a general object of the embodiments described herein to allow for an improved way of scrubbing in a video stream of a video item.

In a first of its aspects, this disclosure concerns a method for performing scrubbing in a video stream of a video item selected at a media device. The video item is streamed from a server system to the media device. The method comprises, at the server system, dividing the selected video item into a number of segments and selecting a first snippet for each segment. The method furthermore comprises pre-buffering, by means of a pre-buffering logic, each snippet and playing, by means of a playback logic, the video stream of a first segment of the selected video item and simultaneously as playing the video stream of the first segment scrubbing to a second segment of the selected video item. When reaching the second segment of the selected video item stop playing the video stream of the first segment and seamlessly start playing the first snippet of the second segment.

In various embodiments each first snippet may correspond to 10% of each segment. Each first snippet may have a start position at a beginning of each segment. However, each first snippet may also be selected based on previous user behavior when streaming the video item or each first snippet may be selected and determined by the server system.

In other embodiments the method further comprises pre-buffering, by means of the pre-buffering logic, a second snippet of the first segment, said second snippet having a starting point corresponding to a location where the video stream of the first segment stopped playing. The method may further comprise playing, by means of the playback logic, the first segment of the video item from the location where it stopped playing in response to rescrubbing to the first segment of the video item.

In a second of its aspects, this disclosure concerns a system for scrubbing in a video stream of a video item selected at a media device, the video item being streamed from a server system to the media device. The system comprises the media device, including a processor and a memory, a user interface, provided at the media device, which is adapted to display the video stream, the server system, which is adapted to divide the selected video item into a number of segments and select a first snippet for each segment. The system furthermore comprises a pre-buffering logic, provided at the media device, which is adapted to pre-buffer each first snippet and a playback logic, also provided at the media device, which playback logic is adapted to play the video stream of a first segment of the selected video item and simultaneously, as playing the video stream of the first segment, scrub to a second segment of the selected video item and stop playing the video stream of the first segment and seamlessly start playing the first snippet of the second segment.

In some embodiments the pre-buffering logic may further be adapted to store 10% of the segment as the first snippet or adapted to store the first snippet starting from a beginning of each segment. The pre-buffering logic may alternatively be adapted to store the first snippet based on previous user behavior when streaming the video item or adapted to store the first snippet based on determination of a content provider.

On other embodiments the pre-buffering logic is further adapted to pre-buffer a second snippet of the first segment, said second snippet having a starting point corresponding to a location where the video stream of the first segment stopped playing. In such a case the playback logic may further be adapted to play the first segment of the video item from the location where it stopped playing.

In a third of it aspects, this disclosure concerns a non-transitory computer readable storage medium, including instructions stored thereon which when read and executed by a computer or media device causes the computer or media device to perform the following steps. Dividing, at a server system, a selected video item into a number of segments, selecting, at the server system, a first snippet for each segment and pre-buffering, by means of a pre-buffering logic, each first snippet. The instructions further cause the computer or media device to perform playing, by means of a playback logic, a video stream of a first segment of the selected video item, scrubbing, simultaneously as playing the video stream of the first segment, to a second segment of the selected video item, and stop playing the video stream of the first segment and seamlessly start playing the first snippet of the second segment.

In some embodiments the non-transitory computer readable storage medium further causes the computer or media device to perform the step of pre-buffering, by means of the pre-buffering logic, a second snippet of the first segment, said second snippet having a starting point corresponding to a location where the video stream of the first segment stopped playing. In such a case the non-transitory computer readable storage medium may further cause the computer or media device to perform the step of playing, by means of the playback logic, the first segment of the video item from the location where it stopped playing in response to scrubbing to the first segment of the video item.

Various embodiments described herein allow a user of a media device to perform scrubbing in a video stream of a video item while playing the video item. The playback of the video item continues as usual until the scrubbing stops, at which instance a snippet of the segment to which the user has scrubbed starts to play seamlessly. Thus, the user will not experience any flicker as in existing implementations which allow scrubbing fast scrubbing of video stills or frames and only allow playback when not scrubbing. When the scrubbing is stopped the media device will seamlessly start playing the video item from the segment to which the scrubbing was performed. One feature that makes this possible is that the playback of the video item after scrubbing does not necessarily start playing exactly at the location to which the user scrubbed but rather from a snippet of the segment to which the user scrubbed. By playing a preselected snippet from the segment to which the user scrubs it is possible to pre-buffer parts or episodes of each segment and to start play these snippets seamlessly.

By using the technique described in this disclosure the user will get a complete new experience when performing scrubbing in a video stream.

BRIEF DESCRIPTION OF THE DRAWINGS

These and other aspects, features and advantages will be apparent and elucidated from the following description of various embodiments, reference being made to the accompanying drawings, in which:

FIG. 6 illustrates a media device playing a video stream and having a straight time line for indicating the location of where in time the video item is being played;

DETAILED DESCRIPTION

The present invention will now be described more fully hereinafter. The invention may, however, be embodied in many different forms and should not be construed as limited to the embodiments set forth herein; rather, these embodiments are provided by way of example so that this disclosure will be thorough and complete, and will fully convey the scope of the invention to those persons skilled in the art. Like reference numbers refer to like elements or method steps throughout the description.

As described earlier, some existing solutions for scrubbing in a video stream of a video item may be inadequate. It is therefore a general object of the embodiments described herein to allow for an improved scrubbing of streamed video items.

To address this, in accordance with different embodiments, described herein are a method and a system for scrubbing in a video stream of a video item selected at a media device. The scrubbing is performed while the video stream is played.

This way, it is made possible to enable a user of the media device to seamlessly go from watching one segment of the video item to another segment of the video item without the hassle of seeing a flickering video stream.

Figure 1:
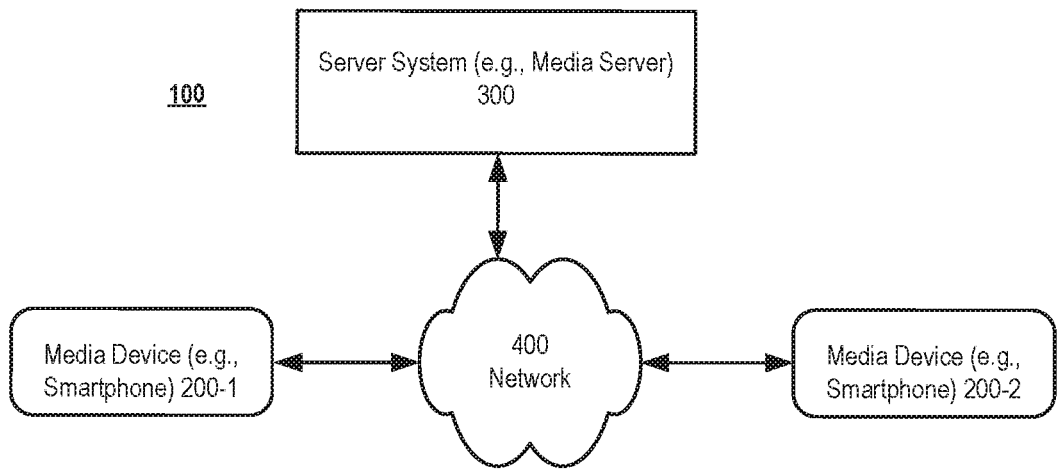
FIG. 1 is a block diagram schematically illustrating an exemplary video content delivery system in accordance with some embodiments.

FIG. 1 is a block diagram illustrating an exemplary video content delivery system 100 in accordance with some embodiments. The video content delivery system 100 may comprise one or several media devices 200 (e.g., media device 200-1 and media device 200-2) and one server system 300 that may comprise one or more servers (e.g., media content servers also known as media servers).

In some embodiments, the media device 200 may be a mobile telephone, such as a smart phone. Alternatively, the media device 200 may be a tablet computer. In yet other embodiments, the media device 200 may be any other media device capable of playback of video content such as, for example, one of the media devices of the following group: a laptop, and a mobile media device (e.g. a handheld entertainment device, or a digital media player).

One or several networks (e.g., network(s) 400) may communicatively connect each component of the video content delivery system 100 with other components of the video content delivery system 100. The network(s) 400 may include public communications networks, private communication networks or a combination of both public and private communication networks. For example, the networks(s) may include any network(s) such as the Internet, other wide area networks (WAN), local area networks (LAN), virtual private networks (VPN), metropolitan area networks (MAN), peer-to-peer networks, and/or ad-hoc networks.

Figure 2:
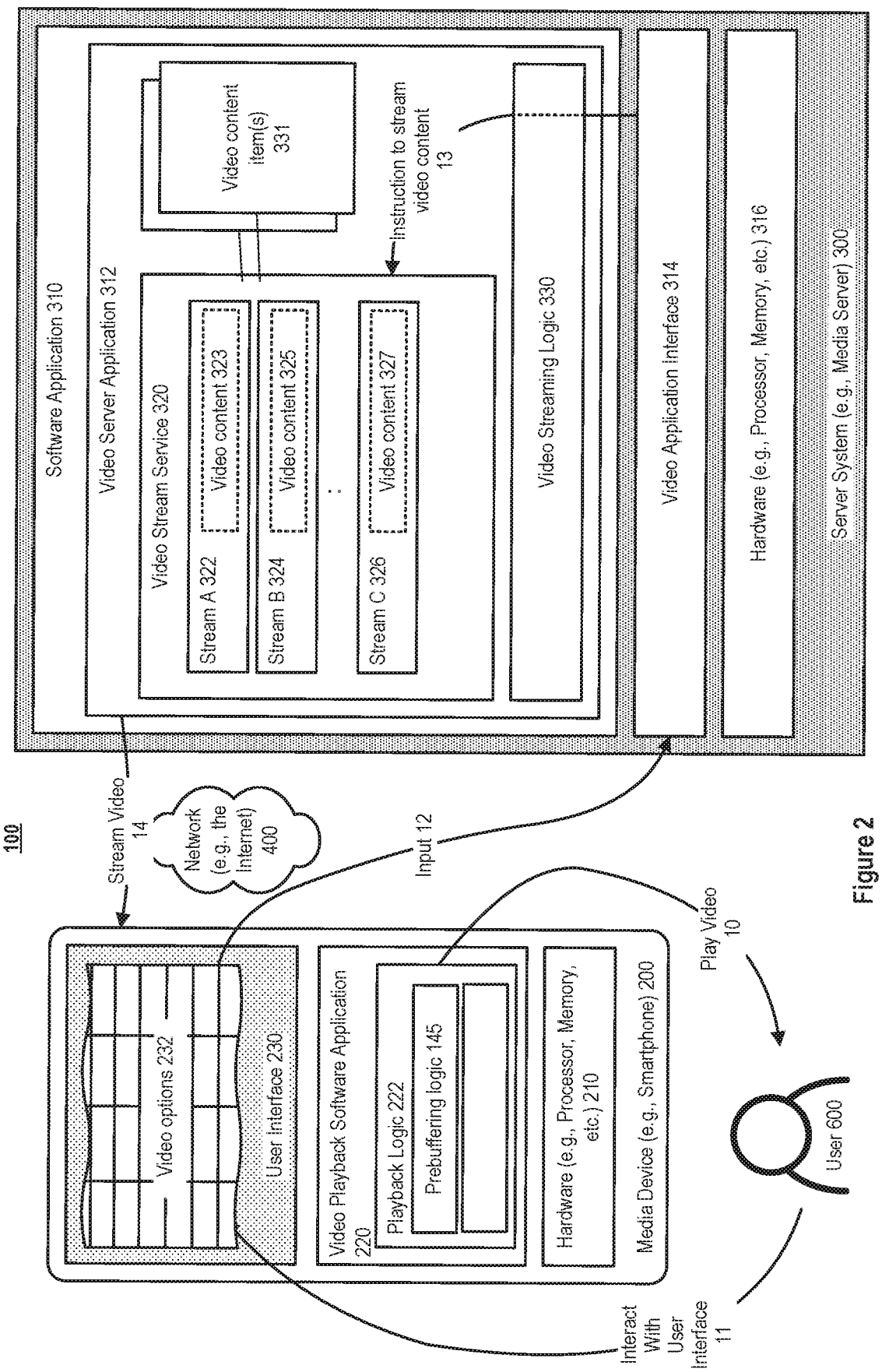
FIG. 2 illustrates an example embodiment of a system for playback of video streams, in accordance with an embodiment.

Turning now to FIG. 2, an example environment where embodiments of this disclosure may be applied will be described. A media device 200, e.g. the media device 200-1 of FIG. 1, may be communicatively connectable to the server system 300 via the network 400, e.g. the Internet, as described hereinabove. As can be seen in FIG. 2, only a single media device 200 and a single server system 300 are shown. However, the server system 300 may support the simultaneous use of multiple media devices, and/or the media device 200 can simultaneously access media content at multiple server systems 300. Although FIG. 2 illustrates the server system 300 in accordance with one example embodiment, FIG. 2 is intended more as a functional description of the various features, or components, which may be present in one or more server systems, rather than a structural schematic of the various implementations described throughout this disclosure. In practice, and as recognized by persons skilled in the art, components shown separately could be combined and some components could be separated.

As is schematically shown in FIG. 2, the media device 200 may be used for the playback of video content (e.g., video content such as a movie), which is provided by the server system 300. The media device 200 may include one or several physical computer resources, or hardware resources 210. The hardware resources 210 may e.g. include one or several processors (or, processing circuitry), a communications interface (or, communication circuitry) and one or several memories. Likewise, the server system 300 operating as a media server may include one or several physical computer resources, or hardware resources 316. The hardware resources 316 may likewise include one or several processors (or, processing circuitry), a communications interface (or, communication circuitry) and one or several memories.

The server system 300 may include an operating system or other processing system which supports execution of a software application 310, including a video server application 312 which may be used, for example, to stream video content. A video stream service 320 may be used to buffer video content, for streaming to one or more media streams 322, 324, and 326. A video application interface 314 may receive requests from media devices 200 or other systems, to retrieve video content 331 from the server system 300.

Video content 331, or video items, may be provided, for example, within a first storage such as a memory (e.g., including a database), or may be received by the server system 300 from another source (not shown). This other source (not shown) could be external to the server system 300, i.e. it may be located remotely from the server system 300 and may is some exemplary embodiments also be stored at the media device itself.

A video streaming logic 330 may be used to retrieve or otherwise access the video content 331 in response to requests from media devices 200 or other systems, and populate the video stream service with streams 322, 324, 326 of corresponding video content data 323, 325, 327 that may be returned, i.e. streamed, to the requesting media device 200.

The media device 200 comprises a user interface 230, which is adapted to display or otherwise provide a visual array of video options 232, for example a two-dimensional grid, a list, or other visual array format, and determine a user input. Each video option in the visual array of video options 232 correspond to a respective video stream 322, 324, 326.

Selecting a particular video option within the visual array 232 may in some embodiments be used, or otherwise interpreted, as a request or instruction to the video server application 312 to stream or otherwise return a corresponding particular video content item. For example, in accordance with some embodiments, the software application 310 at the server system 300 may be used to stream or otherwise communicate video content to the media device 200, wherein the user interface 230 at the media device 200 is adapted to display a plurality of video options that correspond to respective video streams.

In accordance with some embodiments, the media device 200 may also include a video playback application 220, together with a playback logic 222 comprising a pre-buffering logic 145 and other logics, which may be used to control the playback of video content that is received from the video server application 312, for playback by the media device 200, and pre-buffering snippets as described in further detail below.

A user 600 may interact 11 with the user interface 230 and issue requests, for example playing a selected video option at the media device 200. The user's selection of a particular video option may be communicated 12 to the video server application 312, via the video application interface 314. The video server application 312 may then be instructed 13 to stream corresponding video content 13, including one or more streams of video content data 323, 325, 327, and subsequently stream 14 or otherwise communicate the selected video to the user's media device 200. In accordance with some embodiments, pre-buffering requests from the media device 200 may also be communicated 12 to the video server application 312 via the video application interface 314.

Figure 3:
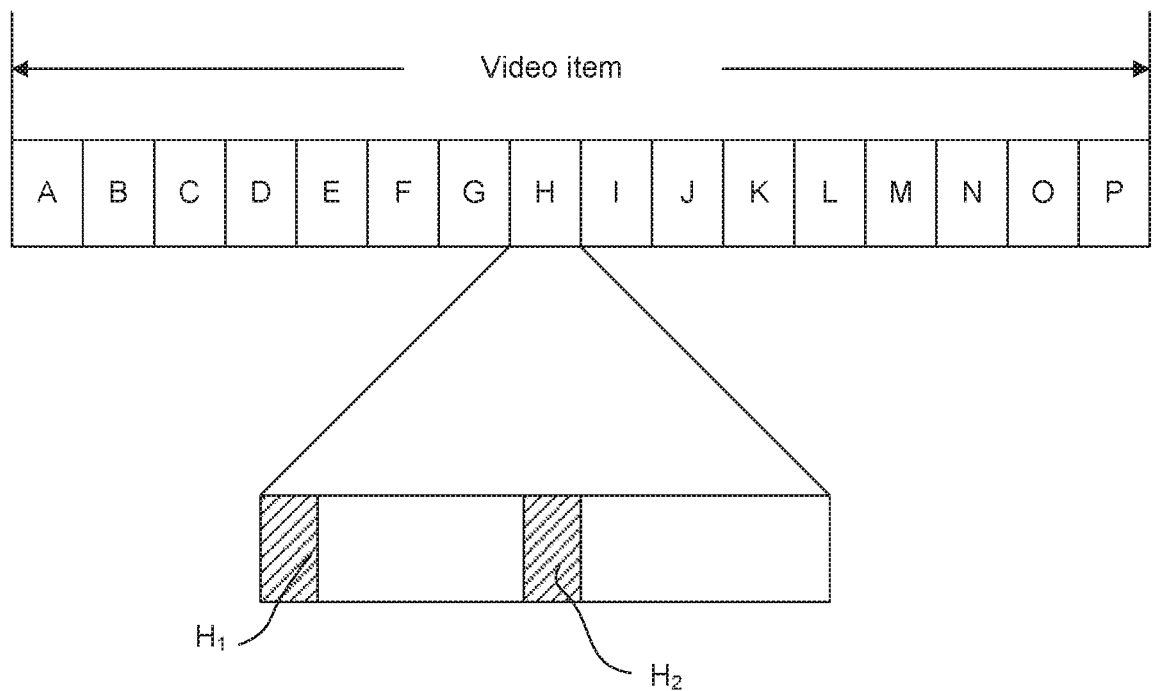
FIG. 3 illustrates an example of video item segments and snippets of a video item segment.

With reference to FIG. 3 a video item is illustrated. According to some embodiments each video item is divided into segments at the server system. As mentioned above the server system is not to be interpreted as one physical server, but is rather defined by the function that it performs, i.e. in this case divide a video item into different segments A to P. Physically this dividing into segments may be performed at the media server 300 but could in some embodiments also be performed at the media device 200 itself, since also the media device 200 is provided with hardware 210 such as processors, memories etc.

With further reference to FIG. 3 it is shown how two snippets $H_1$ and $H_2$ have been selected as representing segment H, which will be described further with reference to FIG. 8. It should be understood that for each segment there is selected at least one snippet representing that snippet. In FIG. 3 each segment is shown as being equally in time (length), but this is only one of many options for dividing the video items into segments. The segments may be chosen such that they each correspond to for example one minute, five minutes or ten minutes etc., as shown in FIG. 3. They may also be chosen such that each segment corresponds to an episode or a feature of the video item, i.e. the segments are differing in time. The selection of snippets may also be performed in a variety of ways. The snippets may be programmatically chosen, e.g. 30 seconds every 5 minutes with a start position for the snippet $H_1$ at the beginning of each segment or with the start position for the snippet $H_2$ in the middle of the segment or any other programmatically chosen way as is understood by a person skilled in the art. The snippets may also be editorially chosen, i.e. an editor picks interesting snippets from each video segment. It is according to some embodiments also possible to choose or pick a snippet based on previous user behavior, i.e. it might be based on the most popular spots of the video item in that particular segment or the like. There are numerous other ways and algorithms that may be used to select a snippet of interest. Usually a snippet corresponds to between 5-25%, preferably 10% of the length of the segment it represents.

Figure 4:
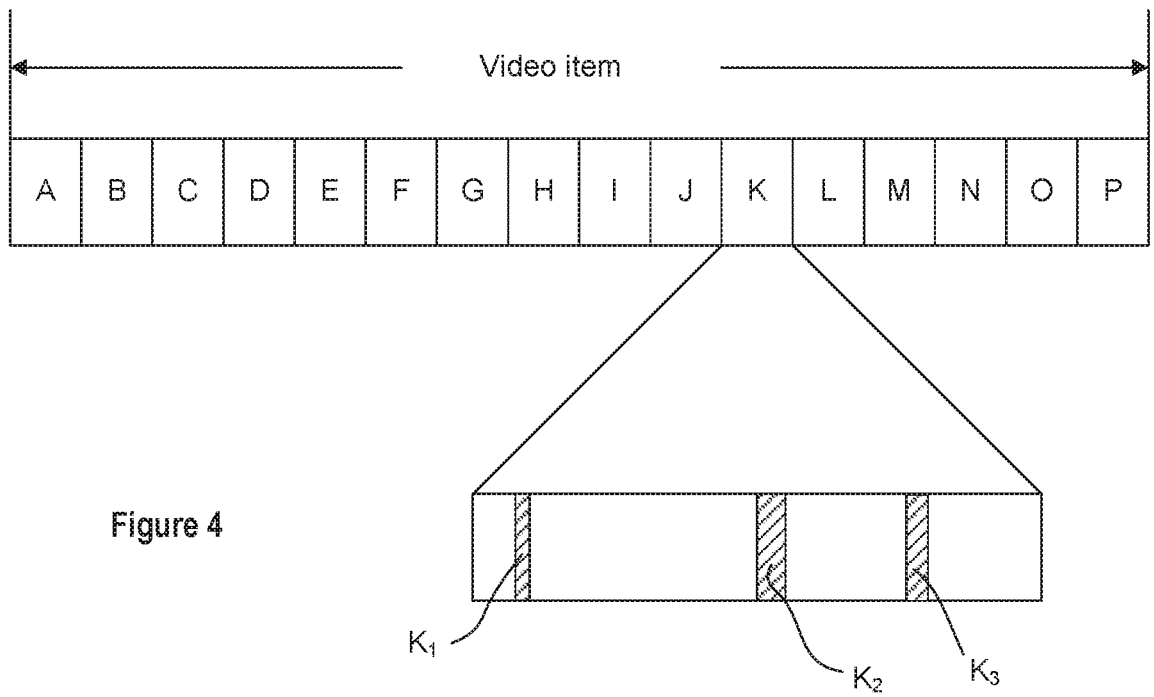
FIG. 4 illustrates another example of video item segments and snippets of a video item segment.

Turning now to FIG. 4 another example of video item segments A to P and snippets of a video item segment are shown. In this example the snippets of segment K are shown as $K_1$, $K_2$ and $K_3$. These snippets have been selected by an editor and have different lengths.

Figure 5:
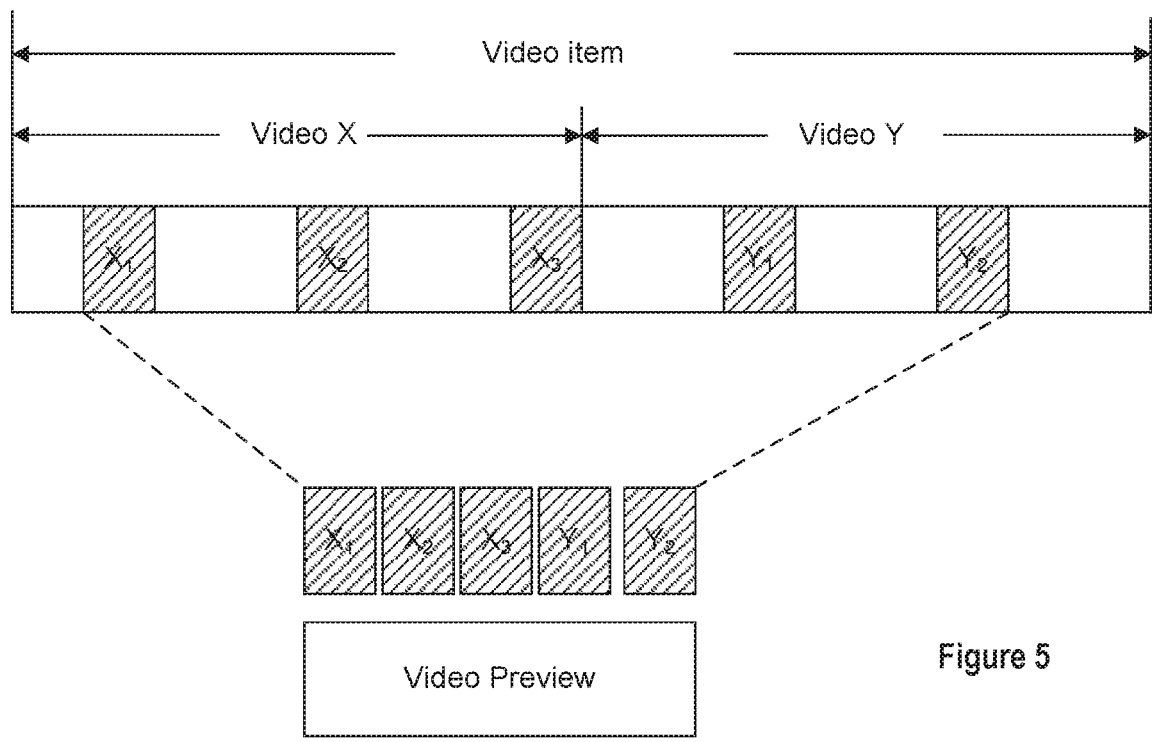
FIG. 5 illustrates how different snippets from two segments make up a video preview.

FIG. 5 illustrates how different snippets from two segments make up a video preview. In this example embodiment the video item comprises two segments, one segment representing video X and Y, respectively. For the first segment, i.e. video X, an editor has selected three different snippets $X_1$, $X_2$ and $X_3$ for representing video X. As illustrated the snippets are of equal length, but as mentioned above and shown in FIG. 4 the snippets may have different lengths. For the second segment, i.e. video Y, the editor has selected two snippets $Y_1$ and $Y_2$ for representing video Y. The selection of snippets may as mentioned above be based on different criteria, but when an editor makes the selection it is often based such that it represents a popular episode or scene. The selected snippets may the together from the base of a video preview or trailer for the video item.

With reference to FIGS. 3-5, different examples of dividing a selected video item into segments have been shown together with how to select a representative snippet or snippets for each segment. However, it should be understood that there are numerous other ways to divide and select segments and snippets, respectively, which is readily appreciated by a person skilled in the art after reading this disclosure.

FIG. 6 illustrates a media device 200 playing a video stream 700 according to some embodiments. The user interface of the media device comprises a straight time line 750 for indicating the location of where in time the video item in the video stream 700 is being played. In the shown example the fifth time segment is being played. When watching the video stream 700 a user that wants to scrub may touch the touch sensitive screen and hold its finger on the screen to start scrubbing. By moving the finger a little to the right the video stream 700 will be scrubbed forward and by moving the finger a little to left the video stream 700 will scrubbed backwards. This is schematically shown by arrows as "touch and hold" in FIG. 6.

Figure 7:
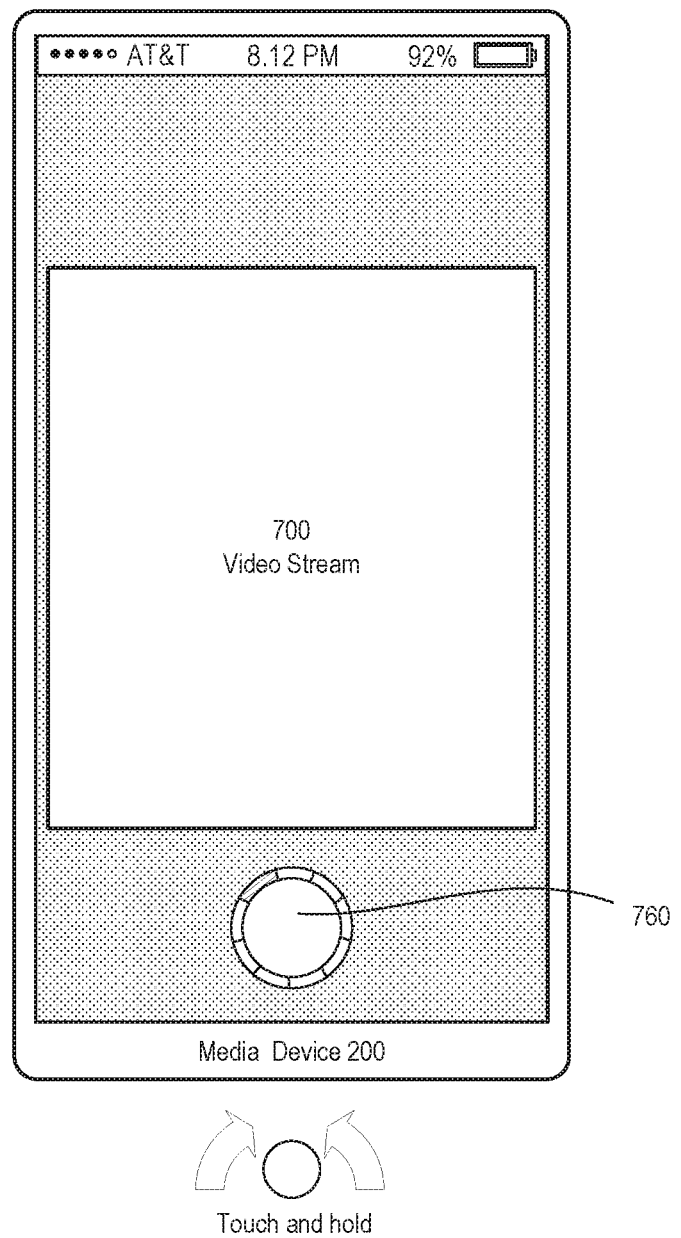
FIG. 7 illustrates another media device playing a video stream and having a circular time line for indicating the location of where in time the video item is being played.

FIG. 7 illustrates another media device 200 playing a video stream 700 and having a circular time line 760 instead of a straight line for indicating the location of where in time the video item in the video stream is being played. The principle for scrubbing is essentially the same for the embodiment in depicted in FIG. 7, as the one described in conjunction with FIG. 6. However the movement of the finger is more rotational as indicated by the arrows as "touch and hold".

Figure 8:
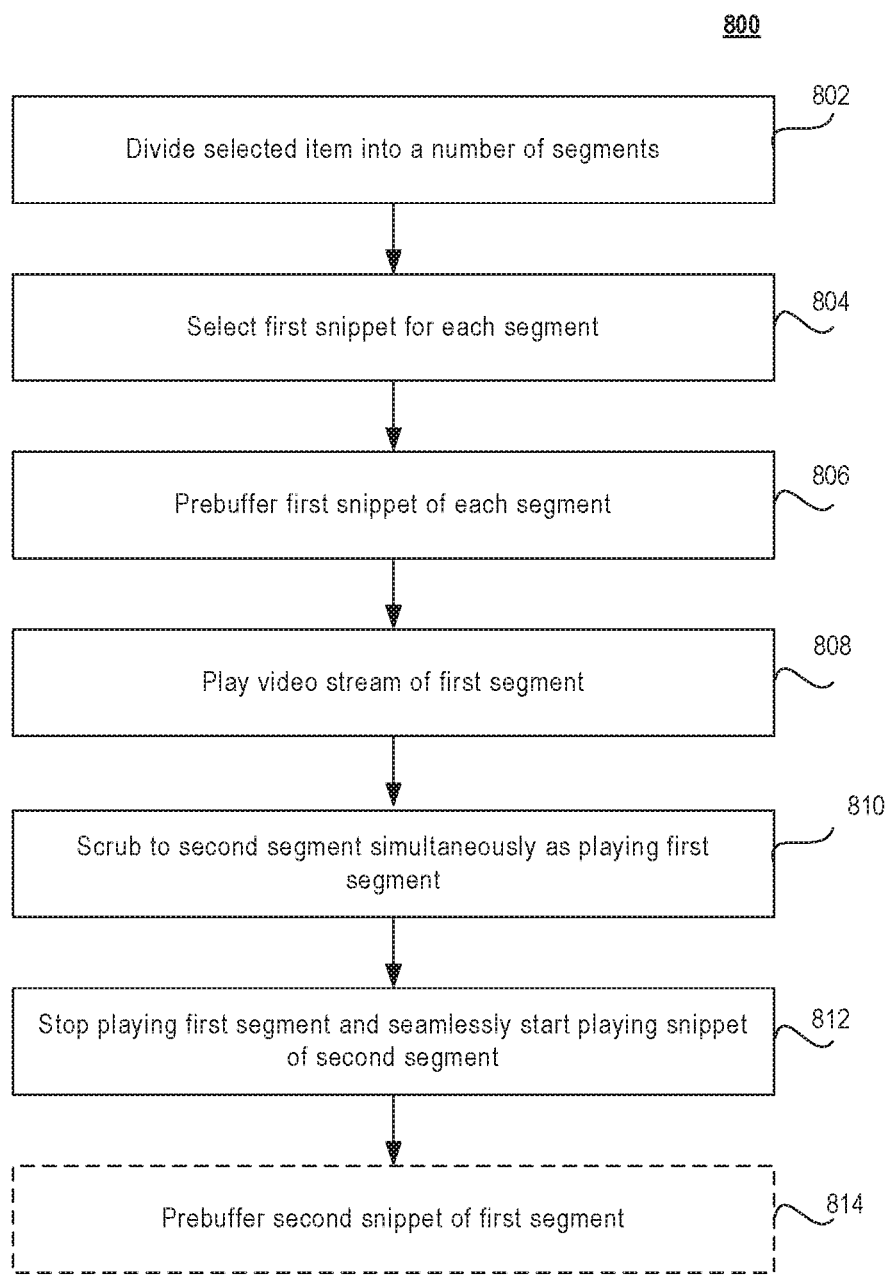
FIG. 8 schematically illustrates a flowchart of a method in accordance with an embodiment.

FIG. 8 schematically illustrates a flowchart of a method 800 for scrubbing in a video stream of a video item selected at a media device in accordance with an embodiment. The video item is streamed from a server system to the media device. The method 800 starts at step 802 in which the server system divides the selected video item into a number of segments. As described above in conjunction with FIGS. 3-5 this division may be done in a variety of ways. Each segment may thus be of equal length in time or may correspond to a scene or episode etc.

The method 800 proceeds with step 804 in which the server system selects a first snippet for each segment. This selection may, as already described above in conjunction with FIGS. 3-5, be done in many different ways. In one embodiment the first snippet is selected such that its starting position is at the beginning of each segment. The length (time) of the first snippet is preferably somewhere in the range of 5-25% of the length of the segment from which it is selected. Preferably, each first snippet corresponds to 10% of each segment, i.e. for example 30 seconds for a segment that is 5 minutes. Instead of selecting a first snippet that starts from the beginning of the segment the selection may instead be based on previous user behavior when streaming the video item. Thus if a certain scene or portion of the segment has been played more often than other scenes or portion, such a popular scene or portion might be selected as the first snippet. The purpose of the snippet is to represent the segment from which it is selected.

The first snippet is then, in step 806, pre-buffered by means of the pre-buffering logic of the media device. Since each segment will have at least one snippet representing that segment all these first snippets will be pre-buffered to the media device.

When a user selects a video item the method 800 starts playing, in step 808, the video stream representing the video item, by means of the playback logic of the media device. The playback logic of the media device starts playing the first segment of video item. If a user now decides to start scrubbing to another segment, i.e. to a second segment, in the video stream the following will happen. Instead of scrubbing with a flickering picture, the playback logic of the media device continues to play, at step 810, the first segment at normal speed, i.e. continues to play the video item while performing scrubbing. Thus scrubbing in the video stream and playing of the video item is done simultaneously. When the scrubbing to the second segment has been done the first segment stops playing and the first snippet of the second segment starts playing immediately, in step 812, i.e. starts playing seamlessly from where the playback of the first segment ended. The reason that it is possible to seamlessly start playing the second segment is that a first snippet representing the second segment already has been pre-buffered to the media device and thus can be played immediately. It is the pre-buffering of snippets representing each segment that makes it possible to start playing a new episode directly after scrubbing.

In another embodiment it is further envisioned to pre-buffer a second snippet of the first segment (814). This may be very useful if a user decides to scrub back to a previously played segment. The second snippet has a starting point corresponding to the location where the video stream of the first segment stopped playing. Thus, when rescrubbing back to a previous segment it is possible to start playing the segment from the location where it stopped playing without and delay, i.e. seamlessly.

Figure 9:
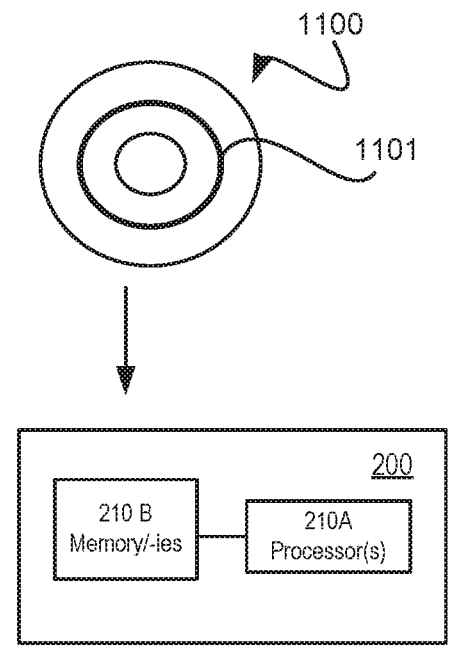
FIG. 9 illustrates a carrier comprising a computer program, in accordance with an embodiment.

Turning now to FIG. 9, still another embodiment will be briefly discussed. FIG. 9 shows an example of a computer-readable medium, in this example in the form of a data disc 1100. In one embodiment the data disc 1100 is a magnetic data storage disc. The data disc 1100 is configured to carry instructions 1101 that can be loaded into a memory 210B of a media device 200. Upon execution of said instructions by a processor 210A of the media device 200, the media device 200 is caused to execute a method or procedure according to any one of the embodiments described in conjunction with FIG. 8. The data disc 1100 is arranged to be connected to or within and read by a reading device (not shown), for loading the instructions into the processor. One such example of a reading device in combination with one (or several) data disc(s) 1100 is a hard drive. It should be noted that the computer-readable medium can also be other mediums such as compact discs, digital video discs, flash memories or other memory technologies commonly used. In such an embodiment the data disc 1100 is one type of a tangible computer-readable medium. The instructions may alternatively be downloaded to a computer data reading device, such as a media device 200 capable of reading computer coded data on a computer-readable medium, by comprising the instructions in a computer-readable signal (not shown)

which is transmitted via a wireless (or wired) interface (for example via the Internet) to the computer data reading device for loading the instructions into a processor 210A of the media device 200. In such an embodiment, the computer-readable signal is one type of a non-tangible computer-readable medium.

Figure 10:
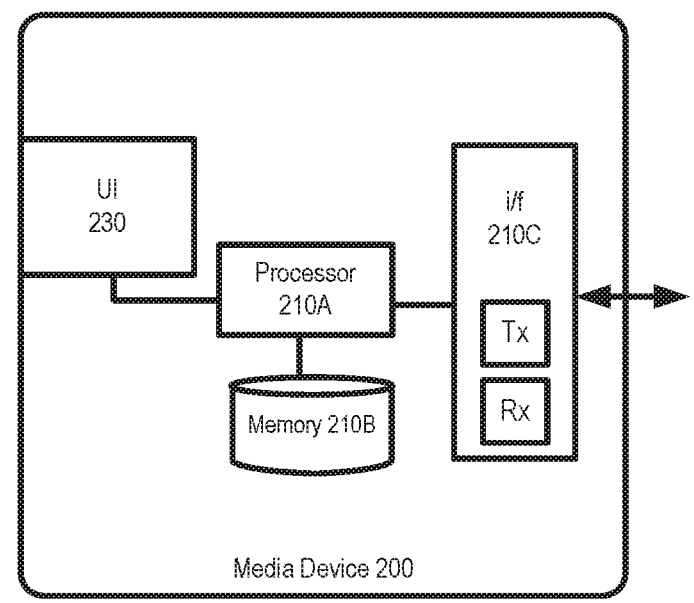
FIG. 10 illustrates an example implementation of an embodiment of a media device.

With reference to FIG. 10, an example implementation of the media device 200 of FIG. 1 will be described in some further detail. For example, the media device 200 may be implemented as a portable electronic device, such as a smart phone, a mobile telephone, a cellular telephone, a tablet computer, a laptop computer, or a personal digital assistant.

In some embodiments, the media device 200 may comprise means adapted to perform the method described below with reference to FIG. 8. In one embodiment, the media device 200 may thus comprise means adapted divide the selected video item into a number of segments. As mentioned above the dividing step is performed by the server system. In conjunction with the present disclosure the server system should be interpreted broadly as performing a function and not that the function has to be performed in or on a certain physical hardware. Thus, normally the dividing into segments of the selected video item is performed in the media server 300. By doing so all media devices 200 that are connected to the media server 300 benefit from the segmentation of the video item since it is centrally performed. However it would also be possible to perform the division into segments locally at the media device, by means of its hardware 210. This may be the case if there are video items locally stored on the media device 200. Also the selection of first snippets may be performed locally, but are mostly performed at the media server 300. However, selecting the second snippet is most preferably performed at the media device 200 since it relates to local behavior of the user at the media device.

With continued reference to FIG. 10, an example implementation of the media device 200 will now be described. The media device 200 is configured to execute, or otherwise perform, any of the methods described above with reference to FIG. 8 either by its own or as a part of a system. As is schematically illustrated in FIG. 10, the media device 200 comprises hardware 210A-C and a user interface (UI) 230. For example, the media device 200 may comprise one or more processors 210A and one or more memories 210B. Also, a communications interface 210C may be provided in order to allow the media device 200 to communicate with other media devices and/or server systems 300, e.g. via a network 400 such as the Internet. To this end, the communications interface 210C may comprise a transmitter (Tx) and a receiver (Rx). Alternatively, the communications interface 210C may comprise a transceiver (Tx/Rx) combining both transmission and reception capabilities. The communications interface 210C may include a radio frequency (RF) interface allowing the media device 200 to communicate with other devices and/or server systems 300 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. The media device 200 may further comprise a user interface 230, which may be comprised of a display and a keypad. Advantageously, the user interface 230 includes a touch-sensitive display. As such, the touch-sensitive display may be a touch screen display upon which virtual keys may be displayed and operated. As described above with reference to FIG. 2, the media device 200 may also comprise one or more applications, e.g. a video playback application 220. These applications may include sets of instructions (e.g., computer program code) that when executed by the one or more processors 210A control the operation of the media device 200.

In some implementations, the one or more memories 210B stores computer program code, which, when run in the one or more processors 210A causes the media device 200 to perform the method described in conjunction with FIG. 8.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks may be provided through the use of hardware such as circuit hardware and/or hardware capable of executing software in the form of coded instructions stored on the above-mentioned computer readable medium. Thus, such functions and illustrated functional blocks are to be understood as being hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

In some embodiments, the present invention includes a computer program product which is a non-transitory storage medium or computer readable medium (media) having instructions stored thereon/in which can be used to program a computer to perform any of the processes of the present invention. Examples of the storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure.

Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality.

What is claimed is:

1. A method, comprising:
   at a client device comprising one or more processors and memory:
   receiving, from a server system, a video stream associated with a selected video item, wherein:
   the selected video item includes a plurality of segments,
   a plurality of snippets is associated with the plurality of segments,
   each snippet of the plurality of snippets is a portion of an associated segment of the plurality of segments to be pre-buffered at the client device and has a length less than a total length of its associated segment;
   prebuffering each snippet of the plurality of snippets;
   playing a first segment of the selected video item;
   while playing the first segment, receiving, at a user interface of the client device, an input indicative of a request to scrub the selected video item from a first position within the selected video item corresponding to the first segment to a second position within the selected video item corresponding to a second segment, wherein the second position is between snippets that have been pre-buffered by the client device;
   in response to the request and in accordance with a determination that the second position corresponding to the second segment has not been prebuffered at the second position, scrubbing, while playing the first segment of the selected video item, to the second segment of the selected video item, including:
   identifying a pre-buffered snippet of the plurality of snippets associated with the second segment;
   selecting, as a playback position, a beginning of the pre-buffered snippet, the playback position being distinct from the second position; and
   playing the selected video item from the playback position.

2. The method of claim 1, wherein a snippet for a particular segment has a start position at the beginning of the particular segment.

3. The method of claim 1, further comprising:
   pre-buffering a second snippet of the first segment, said second snippet beginning at a position where the video stream of the first segment stopped playing.

4. The method of claim 1, further comprising playing the first segment of the selected video item from a position where it stopped playing, in response to rescrubbing to the first segment of the selected video item.

5. A client device, comprising:
   one or more processors; and
   memory storing instructions for execution by the one or more processors, including instructions for:
   receiving, from a server system, a video stream associated with a selected video item, wherein:
   the selected video item includes a plurality of segments,
   a plurality of snippets is associated with the plurality of segments,
   each snippet of the plurality of snippets is a portion of an associated segment of the plurality of segments to be pre-buffered at the client device and has a length less than a total length of its associated segment;
   prebuffering each snippet of the plurality of snippets;
   playing a first segment of the selected video item;
   while playing the first segment, receiving, at a user interface of the client device, an input indicative of a request to scrub the selected video item from a first position within the selected video item corresponding to the first segment to a second position within the selected video item corresponding to a second segment, wherein the second position is between snippets that have been pre-buffered by the client device;
   in response to the request and in accordance with a determination that the second position corresponding to the second segment has not been prebuffered at the second position, scrubbing, while playing the first segment of the selected video item, to the second segment of the selected video item, including:
   identifying a pre-buffered snippet of the plurality of snippets associated with the second segment;
   selecting, as a playback position, a beginning of the pre-buffered snippet, the playback position being distinct from the second position; and
   playing the selected video item from the playback position.

6. The client device of claim 5, wherein a snippet for a particular segment has a start position at the beginning of the particular segment.

7. The client device of claim 5, wherein the memory further stores instructions for:
   pre-buffering a second snippet of the first segment, said second snippet beginning at a position where the video stream of the first segment stopped playing.

8. The client device of claim 5, wherein the memory further stores instructions for playing the first segment of the selected video item from a position where it stopped playing, in response to rescrubbing to the first segment of the selected video item.

9. A non-transitory computer-readable storage medium storing instructions which, when executed by a client device with one or more processors and memory, cause the client device to perform a set of operations, comprising:
   receiving, from a server system, a video stream associated with a selected video item, wherein:

the selected video item includes a plurality of segments, a plurality of snippets is associated with the plurality of segments, each snippet of the plurality of snippets is a portion of an associated segment of the plurality of segments to be pre-buffered at the client device and has a length less than a total length of its associated segment;

prebuffering each snippet of the plurality of snippets;

playing a first segment of the selected video item;

while playing the first segment, receiving, at a user interface of the client device, an input indicative of a request to scrub the selected video item from a first position within the selected video item corresponding to the first segment to a second position within the selected video item corresponding to a second segment, wherein the second position is between snippets that have been pre-buffered by the client device;

in response to the request and in accordance with a determination that the second position corresponding to the second segment has not been prebuffered at the second position, scrubbing, while playing the first segment of the selected video item, to the second segment of the selected video item, including:

identifying a pre-buffered snippet of the plurality of snippets associated with the second segment;

selecting, as a playback position, a beginning of the pre-buffered snippet, the playback position being distinct from the second position; and playing the selected video item from the playback position.

10. The computer-readable storage medium of claim 9, wherein a snippet for a particular segment has a start position at the beginning of the particular segment.

11. The computer-readable storage medium of claim 9, wherein the memory further stores instructions for:

pre-buffering a second snippet of the first segment, said second snippet beginning at a position where the video stream of the first segment stopped playing.

12. The computer-readable storage medium of claim 9, wherein the memory further stores instructions for playing the first segment of the selected video item from a position location where it stopped playing, in response to rescrubbing to the first segment of the selected video item.

* * * * *